Nov. 27, 1962  G. J. BROWN  3,065,625
FORCE APPLYING AND MEASURING DEVICES
Filed July 10, 1959  6 Sheets-Sheet 1

INVENTOR.
GEORGE J. BROWN
BY
ATTORNEY

FIG. 3.

INVENTOR.
GEORGE J. BROWN

Nov. 27, 1962    G. J. BROWN    3,065,625
FORCE APPLYING AND MEASURING DEVICES
Filed July 10, 1959    6 Sheets-Sheet 3

INVENTOR.
GEORGE J. BROWN
BY
*Philip Subkow*
ATTORNEY

Nov. 27, 1962 G. J. BROWN 3,065,625
FORCE APPLYING AND MEASURING DEVICES
Filed July 10, 1959 6 Sheets-Sheet 4

INVENTOR.
GEORGE J. BROWN
BY
ATTORNEYS

Nov. 27, 1962 — G. J. BROWN — 3,065,625
FORCE APPLYING AND MEASURING DEVICES
Filed July 10, 1959 — 6 Sheets-Sheet 5

INVENTOR.
GEORGE J. BROWN
BY
ATTORNEY

Nov. 27, 1962 G. J. BROWN 3,065,625
FORCE APPLYING AND MEASURING DEVICES
Filed July 10, 1959 6 Sheets-Sheet 6

FIG. 12.

INVENTOR.
GEORGE J. BROWN
BY
Philip Subkow
ATTORNEYS

United States Patent Office 3,065,625
Patented Nov. 27, 1962

3,065,625
FORCE APPLYING AND MEASURING DEVICES
George J. Brown, Los Angeles, Calif., assignor to Statham Instruments, Inc., Los Angeles, Calif., a corporation of California
Filed July 10, 1959, Ser. No. 826,216
16 Claims. (Cl. 73—4)

This invention relates to a method and apparatus for transmitting an applied load by means of a liquid to a member to be loaded by the hydraulic pressure generated in the liquid by means of the load.

While the present usefulness of the principles of my invention is primarily in the field of instrumentation and particularly in the field of measurement of loads, whether or not they be applied by means of a fluid, the principle is applicable wherever it is desired that there be a linear relationship between the load applied at one portion of the hydraulic system and the multiplied load "read out" at another portion of the hydraulic system.

While such linear relationships are inherent when the fluid is an incompressible liquid, the relationship between the load applied at one portion of the hydraulic system and the load read out at another portion of the system becomes non-linear if at either place there is a mechanism involved either at the point of application of the load or at the "read out" point where the fluid pressure is transmitted to any member which is to be made responsive to the transmitted load and which thus may be said to "read" the load at the "read out" point.

This, as I have found, is because in any such mechanism where stiffness or friction is present, it is most difficult to keep these factors constant independent of the magnitude of the forces involved. This is particularly true according to my experience if the mechanism of load application or load "read out" involves a displacement of a member under the applied or transmitted loads which member transmits the applied load to the "read out" mechanism. Thus, where the load is applied and "read out" by means of a diaphragm which transmits the pressure of liquid to the "read out" mechanism through a load transfer member, the non-linearity of the displacement of the diaphragm under varying loads imposes the limitations described above. Where a piston is used, leakage imposes one form of limitation and packing or piston rings introduced variable friction forces.

In order to avoid this difficulty I have in the invention described in this specification provided mechanism whereby the load applied to the hydraulic system creates a fluid pressure which is independent of any motion or displacement of any movable member of the system or of the friction restraints on or stresses in the members.

This is accomplished by a servo-system which acting in cooperation with the hydraulic system maintains the hydraulic pressure resulting from the applied load constant and independent of such displacement, friction or stress.

At the "read out" point, the load is transmitted to the "read out" mechanism in such manner that the point of load application to the "read out" mechanism is stable, i.e., is maintained at a substantially constant position at the "read out" point. In using a diaphragm to transmit the load from the hydraulic system to the "read out" mechanism through a load transfer member, this is preferably accomplished by maintaining the diaphragm and load transfer member in a substantially fixed position irrespective of the applied load.

In my invention, I accomplish this result by means of a hydraulic restoring force monitored by a position servo-mechanism which maintains the diaphragm and load transfer member preferably but not necessarily at a substantially fixed position.

In general outline my method of load application applies a force at each of two points of a system between which a load is to be generated, called the "read out" point. A load is applied at one of the points, and an opposing load is applied to the other of said points in an opposite direction sufficient to cancel out any displacement of the first mentioned point resulting from the application of said load.

I have applied the above principles of my invention to a dead weight load tester in which the applied loads consist of weights. These weights act as static loads which generate a hydraulic pressure which is accurately proportionate to such weights. This is accomplished by a mechanism which adjusts the pressure in proportion to the applied weights and independent of the movement of the member receiving the weights. The hydraulic pressure so generated is transmitted to a hydraulic load cell of the diaphragm type wherein the generated hydraulic pressure acts against a diaphragm. The load on the diaphragm is transmitted to the piston which transmits the load to the "read out" point. In order to maintain the position of the diaphragm and piston, a restoring load is transmitted to the piston and the diaphragm by means of a position servo-mechanism. In consequence, any member placed between the two points at the "read out" point will be loaded accurately in an amount which is directly and accurately proportional to the applied hydraulic load. If this member is placed between such points and includes a force reading mechanism, the load applied at this "read out" point is transmitted to and read by the mechanism herein referred to as the "read out" mechanism. Thus, if the "read out" mechanism is a load cell, the device may be employed as a load cell tester, i.e., a calibrating device for the load cell.

These and other objects of my invention will be further described in this specification taken together with the accompanying drawings in which.

Figures 1, 2:
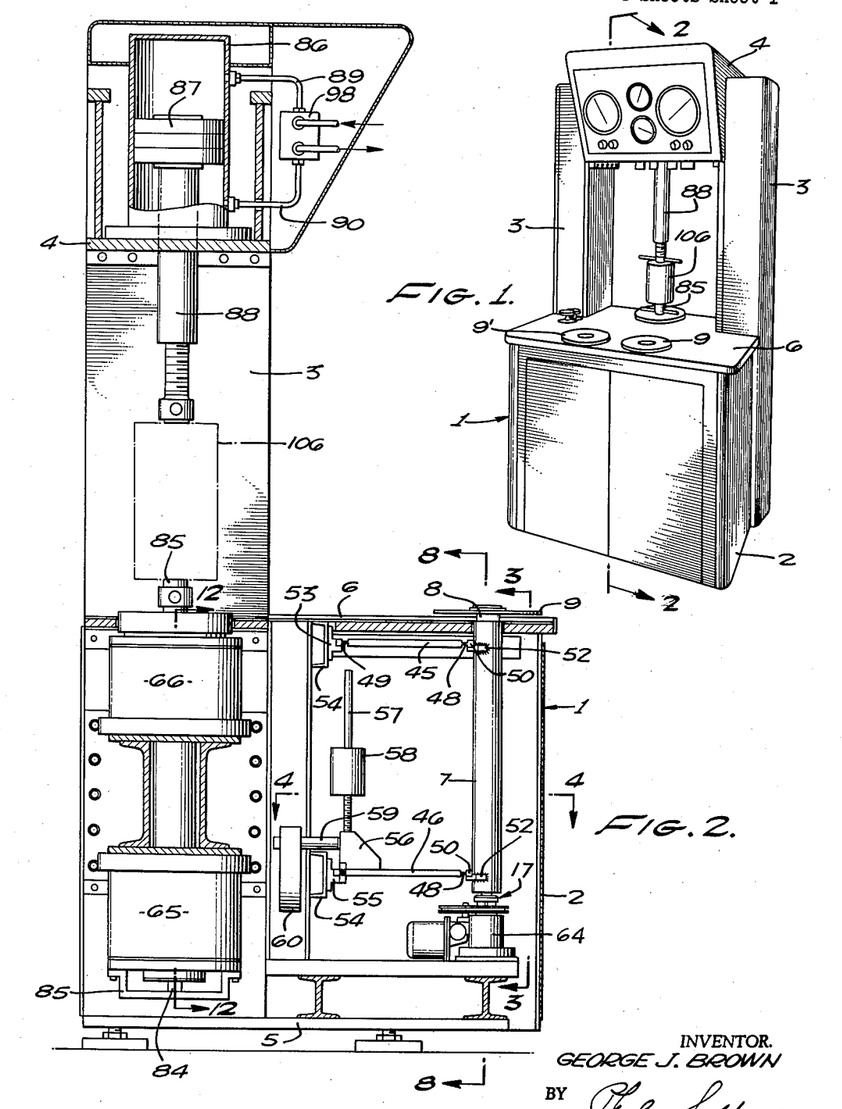
FIG. 1 is a prospective view of the console containing the tester embodying my inventions.
FIG. 2 is a section, with parts in elevation, taken on line 2—2 of FIG. 1.

The console 1 contains a cabinet 2 and framing uprights 3, top cross member 4 and bottom 5 and platform 6 (see FIGS. 1 and 2).

The open ended tubes 7 carry at their top a header 8 with a top plate 9. The header is connected to a plug 10 by a rod 11 to a tube 12 axially disposed in the tube 7. The bottom of the tube 12 is closed by a plug 13 carrying a thrust supporting ball bearing 14 axially aligned with the tube 12. The ball bearing housing 17 carrying ball bearing 18 is positioned on the flange 19 of the cup-shaped member 20. A ball 21 is positioned between the end of the piston 22 and the member 20. Spaced from the end of the cup 20 is a collar 20' connected by set screws to the piston 22 and by a diaphragm 22' to the top of ring 23 positioned on the top of the pulley 24. The two pins 25 are mounted in the face of the pulley at diametrically opposed positions and each bears against a leaf spring 26 connected to the ring 23. The piston passes through a stationary hub mounted on the top of the cylinder block 28. The pulley 24 is rotatably mounted on the ball bearing 29.

The cylinder block (see FIGS. 8 and 10) is bored to form the piston cylinder 30 carrying two spaced circular grooves 31 and 32. The cylinder is closed by plug 33. The piston is grooved to give a necked down section 34. The lower end of 34 is bored with a transverse port 35 and the end is axially bored to provide an axial port 36 in which is positioned a plug 37 carrying an axial port 38 and a counterbore 38' which discharges fluid under the end 39 of the piston 22 into the chamber 40 between the end of the piston and the plug 33 and plug 37.

The cylinder block is bored with a transverse bore 41 at the groove 32, a transverse bore 42 at the groove 31 and a transverse bore 43 at the place in the cylinder 30 adjacent the necked portion 34. Displaced 90° from the ports 41, 42 and 43 is a port 44 (see FIGS. 3, 8 and 11) positioned adjacent the inner end of the plug 33. Suitable line connections are provided at the discharge end of the bores 41, 42, 43 and 44 as shown.

The pan 9 and cylinder 7 are connected to the panel 54 of the cabinet 2 (see FIGS. 2, 3 and 8) by means of flexural elements. The top of the cylinder 7 is connected to a plate 45 and the bottom to a plate 46, both of the same construction. The plates are each notched at 51 at each end of the plate (see FIG. 4) and are both grooved at 48 and 49 to provide leaf flexure sections at each end of each plate. One end 50 of each plate 45 and 46 is bolted at the grooved section to a bracket 52 which is welded to the tube 7, one near the top and one near the bottom of the cylinder 7. The opposite end of the plate 45 is bolted at the flexure to the bracket 53 in a manner similar to the like connection for the plate 46 as shown in FIGS. 2 and 4. The bracket 53 is carried on the back support 54 of the cabinet 2.

Figure 3:
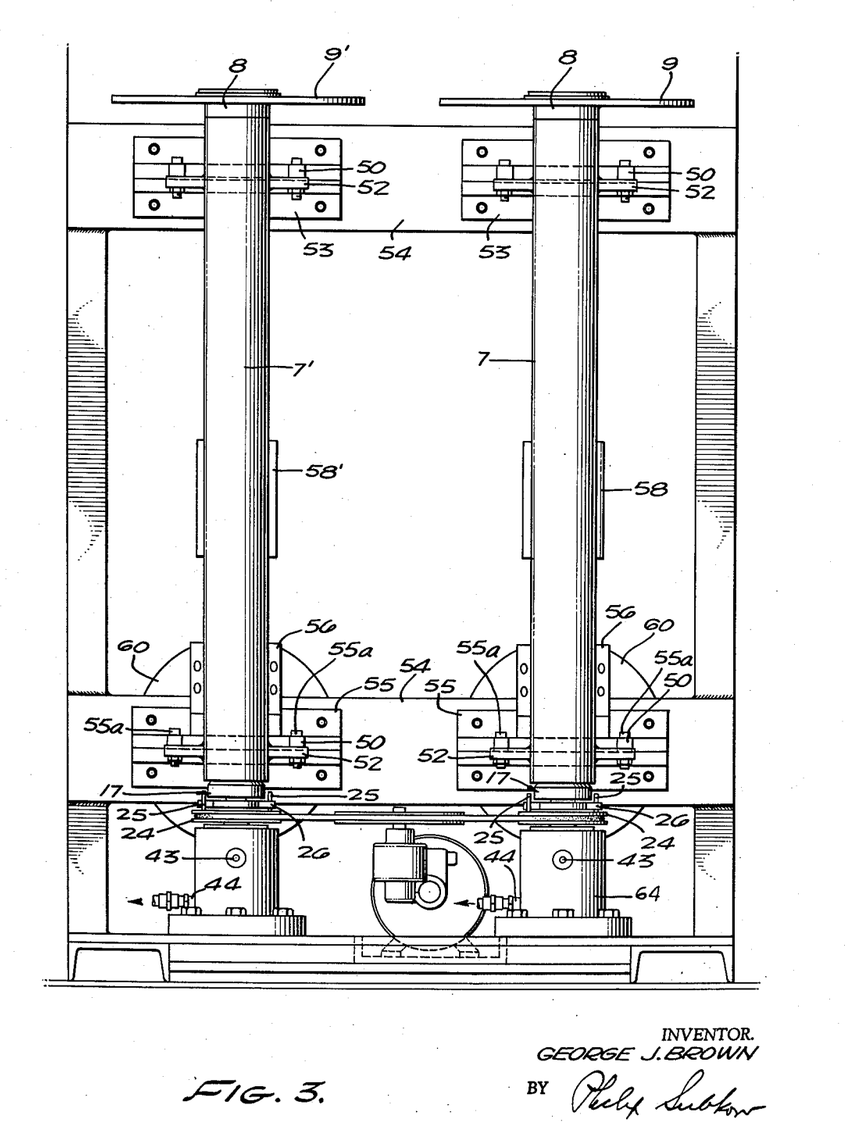
FIG. 3 is a front elevation of the lower portion of FIG. 2 taken on line 3—3 of FIG. 2.
Figure 4:
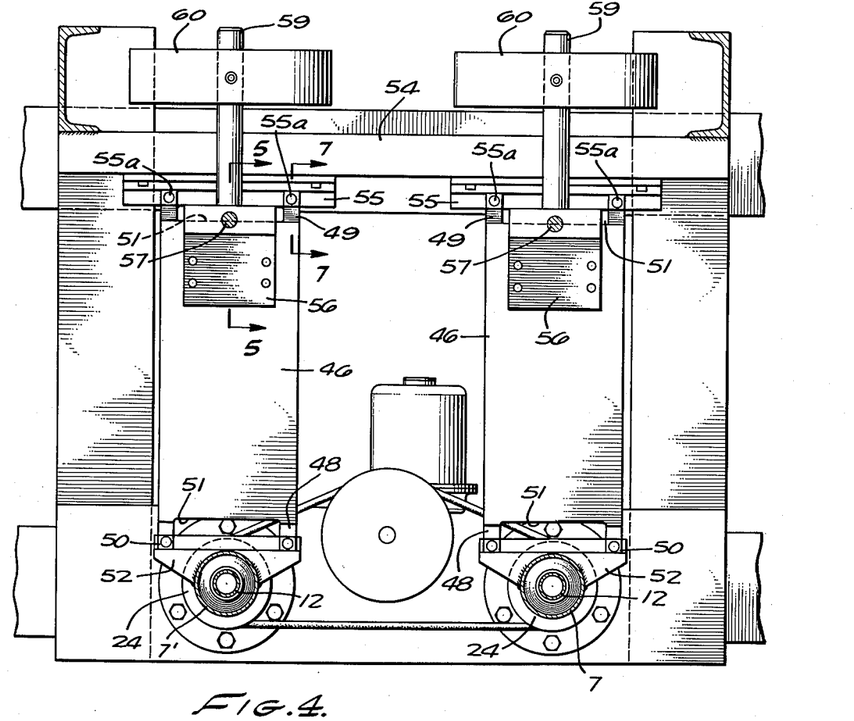
FIG. 4 is a section taken on line 4—4 of FIG. 2.

The lower plate 46 is connected to the bracket 55 to which the notched and flexured end of the plate 46 is connected by means of bolts 55a (see FIGS. 2, 3, and 4). The bracket 56 mounted on the plate 46 carries an upright rod 57 perpendicular to the plate 46. The weight 58 may be adjusted along the rod 57. A rod 59 extends from the bracket 56 parallel to the plate 46 (see FIG. 2) and carries a weight 60.

Figure 5:
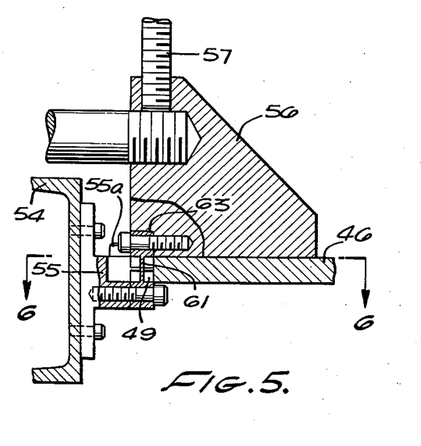
FIG. 5 is a fragmentary section taken on line 5—5 of FIG. 4.
Figure 6:
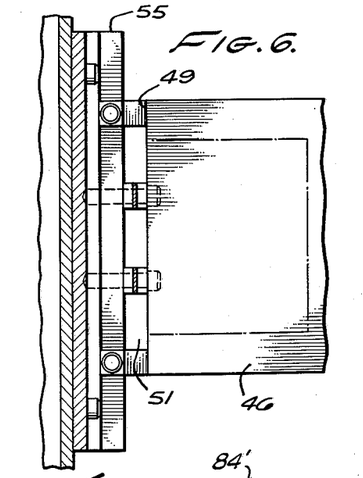
FIG. 6 is a fragmentary section taken on line 6—6 of FIG. 5.

A pair of vertical leaf flexures 61 formed between two flange ends 63 are positioned between the bracket 56 and the bracket 55 (see FIGS. 5 and 6) in the notches 51 between the flexures 49. The flexures 49 and 61 thus form a cruciform flexural connection between the plate 46 and bracket 56 and the bracket 55.

The above construction of the load applying standard is shown as duplicated on two identical columnar structures (FIGS. 1, 2, 3 and 4). In order to distinguish these two load applying columns they will be described and identified as a tension load applying member and compression load applying member as will be more fully described below. Identical parts of the two systems bear the same numbers, the compression load applying system is numbered with prime numbers.

Figure 12:
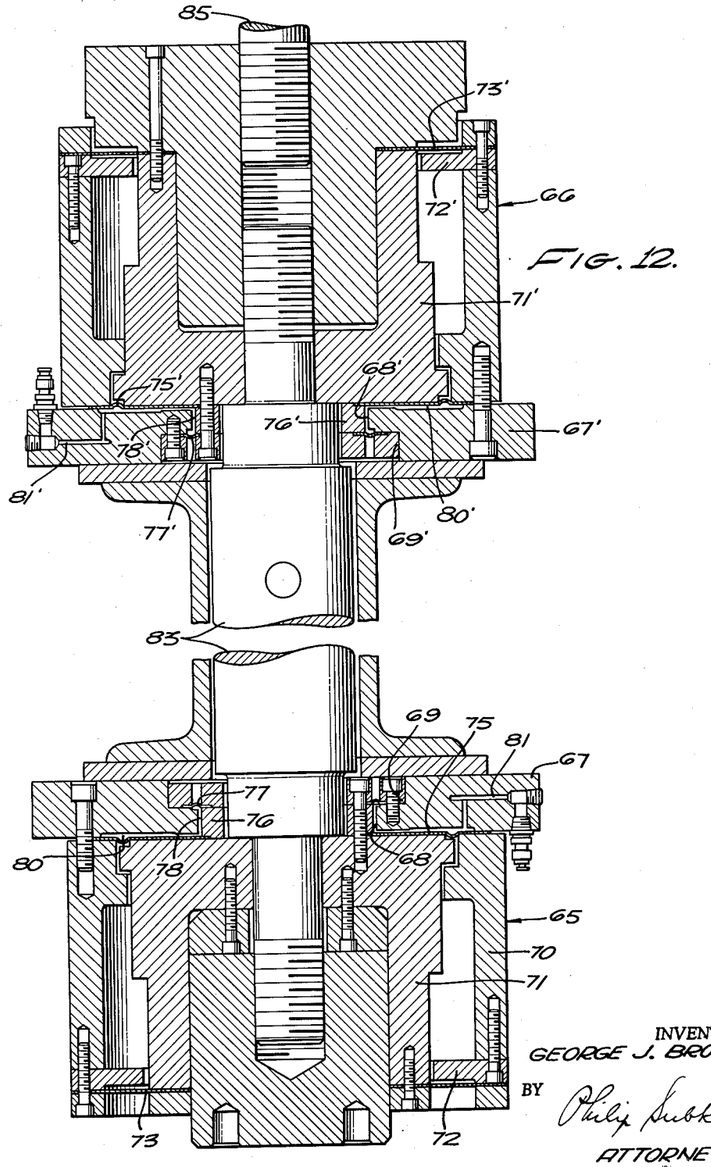
FIG. 12 is a section taken on line 12—12 of FIG. 2.

The pressure transmitting elements are composed of a load cell in which a hydraulic pressure responsive diaphragm is connected to a force or motion transmitting element with means for introducing an opposing and balancing load to generate a force or motion in opposition to the first mentioned force or motion. The element transmits the force or motion to the "read out" point, as specifically shown in the drawing and two identical hydraulically operated load cells 65 and 66 (see FIGS. 2 and 12) are mounted back to back. The load cells are each of the same construction and are composed of a base 67 bored at 68 and counterbored at 69 and carrying a cylinder 70 into which is fitted a piston 71 in an annular stay plate 72. The piston is connected to the top of the cylinder 70 by means of annular diaphragm 73 which forms a flexural connection between the cylinder 70 and piston 71. The bottom of the piston 71 is connected to the cylinder 70 and annular diaphragm flexure 75 by a clamping ring 76. A second annular diaphragm 77 connects the cylinder 70 and the piston. A chamber 78 is formed between the diaphragm 77 and the base 75.

The space 80 formed between diaphragm 75 and base 67 and the space 78 is filled with oil via the port 81. The upper load cell 65 is constructed in substantially the same manner like parts being shown by primed numbers except the piston 71 in cell 65 shown in section on a line taken at 90° to the section of the piston 71' for purposes of illustrating its construction. The load cells 65 and 66 carry a centrally positioned column 83 which is threaded into the pistons 71 and 71' and make a rigid connection between the two pistons. The lower end of the piston 71 is connected to one end of a displacement sensitive transducer 84. The transducer may be any one of the many available displacement sensitive transducers, for example, of the electrical resistance strain gage type, for example (see U.S. Patent No. 2,573,286 or 2,760,037), or of the electromagnetic type or any other type. Any of these will produce a signal voltage proportional to displacement. The frame of the transducer is mounted with one end of the transducer positioned on the yoke 85 (see FIG. 2), connected to the cylinder 70. The displaceable member of the transducer is connected to the end of the piston 71. The movement of the pistons and column 83 to or away from the yoke 85 will cause a displacement of the movable member of the transducer with respect to the frame of the transducer. Conventional circuitry shown schematically at 84' in FIG. 13 will result in a signal output whose magnitude and direction is responsive to the magnitude and direction of motion of the column 83. The opposite end of the piston 71' of the load cell 66 carries a rod 85 to which a "read out" device may be connected as will be described below.

A motor in the form of a hydraulic cylinder 86 is mounted on the header plate 4. It carries a piston 87 and a piston rod 88 with suitable packing. A pipe connection 89 and 90 to the cylinders is provided above and beneath the piston head 87. The rod 88 is provided with means for connecting the rod to the "read out" device.

Figure 13:
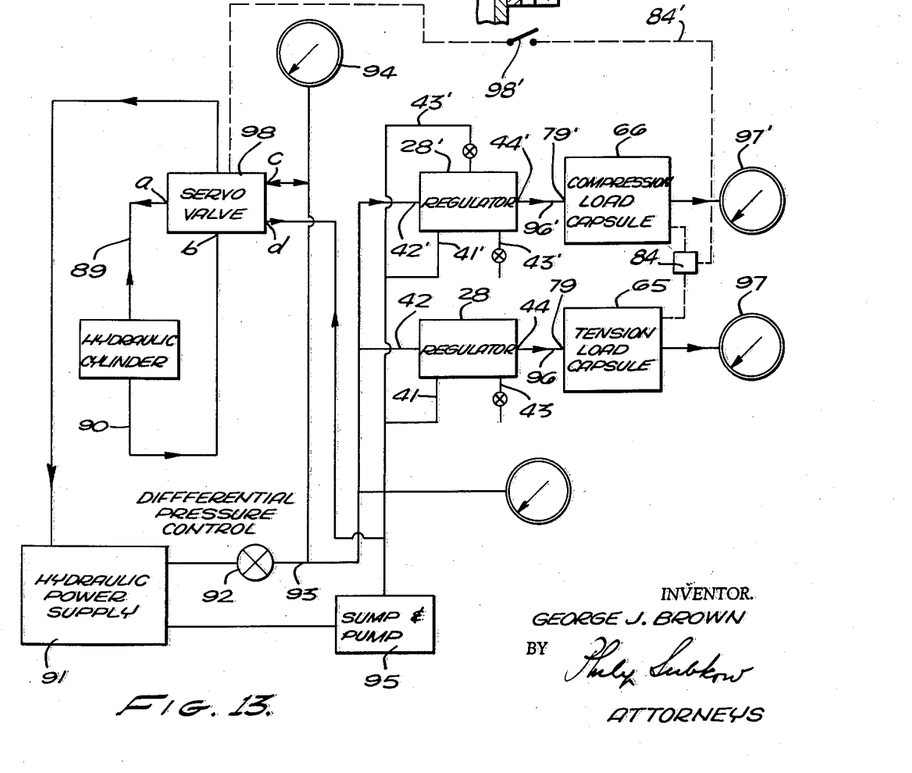
FIG. 13 is a schematic drawing of the hydraulic circuit of the device.

The hydraulic system is shown schematically in FIG. 13. The hydraulic power supply 91 feeds liquid such as oil under pressure through a valve 92 to establish a desired pressure in line 93 which may be read on gage 94 located at the top of the unit (see FIG. 1). The pressure is applied through 42 and 42' to the regulators 28 and 28'. The regulators have a discharge connection via 41 and 41' back to a sump 95 and from the sump 95 by way of a pump back to the supply source 91. A valve bleed connection 43 and 43' to atmosphere is provided to drain or vent the system if desired. The regulators are connected by a line 96 and 96' which connects the ports 44 and 44' to the inlet ports 79 and 79' respectively. The gages 97 and 97' are positioned alongside the gages 94 (see FIG. 1). The servo valve 98 mounted on the unit has four ports a, b, c, and d. Port a is connected to 89, port b to 90, port c to 93 and port d to the sump.

The servo valve 98 may be of any kind to regulate the passage of oil into either 89 or 90 responsive to the signal from the position sensitive transducer 84. One which may be used is the one such servo valve as described in the U.S. Patent 2,884,906 or Patent 2,884,907.

The signal output from the transducer 84 is amplified and fed by electrical circuit 84' (FIG. 13) to the motor which actuates the valve mechanism of the servo-valve, for example, to the torque motor of the servo-valve shown in the above patents. This actuates the servo-valve to monitor the flow of oil to 86 via 89 or 90 responsive to the signal from the transducer 84 to move the piston 87 in a direction opposite the motion of the rod 83 which generates the signal and in an equal amount to reestablish the position of the piston 71 and 71' to that which it occupied before the signal was generated.

It will be observed, however, that with no pressure on the oil in the system, the weight on the diaphragms 75 and 75', composed of the weight of piston 71', column 83 and piston 71, hangs on the diaphragms 75 and 75' and will cause them to deflect as will be described below. Means are provided to cancel this deflection and to position the diaphragms and piston in their "null" positions.

Figure 7:
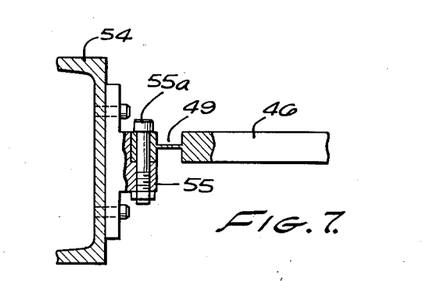
FIG. 7 is a fragmentary section taken on line 7—7 of FIG. 4.

In order to cancel out the stiffness of the flexure elements 48, 49 and 61, and thus eliminate for all practical purposes any restoring force to oppose the load placed on pans 9 and 9', the weight 58 and 58' is supplied. It will be seen that this weight is aligned with the cross flexure on plate 46 and 46'. The cross flexure is composed of the horizontal flexure 49 and vertical flexure 61 and 49' and 61'. The weight 58 as well as 58' mounted on rod 57, whose axis is displaced a short distance from the plane of the flexure 61 towards the cylinder 7 or 7' acts as an overhung pendulum to act in the same direction as a weight in the pan 9 or 9'. The overhung pendulum opposes the stiffness restoring force arising from any bending of the flexures. Thus, for example, the height and mass of the weight 58 is adjusted so that a fraction of a gram is sufficient to bottom the piston 22 against the plug 33. In like manner a like weight is provided on the companion plate of the companion pipe of the system. The counter weight 60 is provided to balance the tare weight of the tube 7 and the elements connected thereto above the ball 14 in each column (see FIGS. 2 and 7). Thus with no load on the pan 9 the column 7 is free floating and exerts substantially no load on the cylinder 22. The weight of the housing and ball bearing 18 is taken up on the flexible diaphragm 26.

Assuming that the system is filled with oil, the motor 64 is started and the pulley 24 rotates the piston 22 via the pins 25 and the leaf springs 26. The purpose of the rotation of the piston is to prevent the build up of static friction between the piston 22 and the cylinder 30. The diaphragm 22' is rigid within its plane but is very flexible in a direction normal to the plane of the diaphragm. As result of this construction, substantially no axial load is imposed on the piston either due to static weight or as a result of this rotation.

Figures 8, 9, 10:
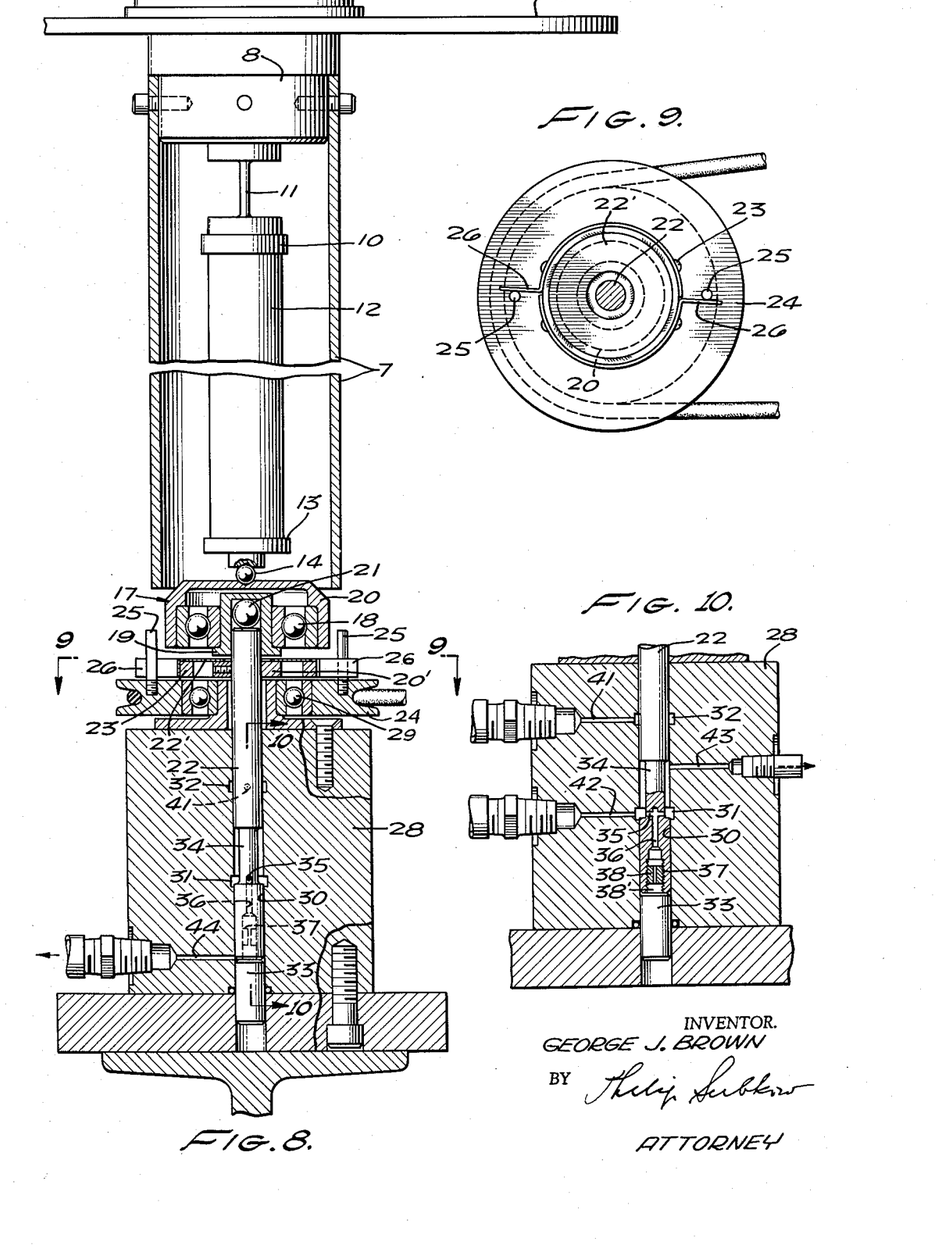
FIG. 8 is a section taken on line 8—8 of FIG. 2.
FIG. 9 is a section taken on line 9—9 of FIG. 8.
FIG. 10 is a fragmentary section on line 10—10 of FIG. 8.

The load is applied to pans 9 or 9' by means of weights placed on the pans and this load acting through tube 12 and ball 14 on the piston 22 pushes it to the bottom as shown in FIG. 10.

Assume a tension load is to be applied to a "read out" mechanism such as a load cell or pressure gage to be tested. The "read out" mechanism is connected to 88 and 85. This is shown as 106 (see FIGS. 1 and 2). Such cells and gages, as is well known, have transducers associated with them which "read" the load applied thereto and report the loads in the form of some intelligible signal which is proportional to the applied load. Simultaneously, oil is also admitted to the space 81' of the compression load cell from the regulator 28'.

Figure 11:
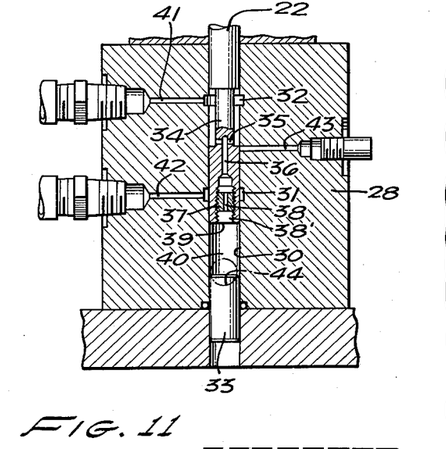
FIG. 11 is a section similar to FIG. 10 showing another position of the mechanism.

Referring back to the regulators 28 and 28', when the piston has moved upward as a result of the pressure introduced through 42 and 42', the pistons in 28 and 28' assume the positions shown in FIG. 11, shutting the ports 42 and 42'. Oil thus fills the chamber 40 in 28 and 28', the chambers 80 and 80' in the load cells 65 and 66 and all communicating lines under the pressure generated by the load on the pans 9 and 9' and independent of the pressures in the hydraulic line 93. Since no load has yet been placed on the pans 9 and a tare load, as will be further described, on the compression load pan 9', the piston 22 of the regulator 28 and piston 22' of the regulator 28' are each at the top of its travel in the cylinders 30. But since there is no load on pan 9 and 9', the oil in 80 and 80' is at ambient pressure. The weight of the pistons 71', 71 and column 83 suspended on diaphragms 73', 75', 77', 73, 75 and 77 causes a slight deflection depending on the rigidity of these diaphragms and thus will cause a displacement of 71 towards the yoke which may be sufficient to cause an actuation of the transducer 84 and a signal output. At this point the motor of the servo-valve 98 is not in the circuit with the transducer, switch 98' in the electrical circuit between the transducer and the motor of the servo valve being open. The load cell will thus be under the tension load of the column weight and the "read out" mechanism will give a position signal. In order to cancel out the weight of the column composed of pistons 71, 71', and the rod 83, the "read out" mechanism, such as a load cell 106, is connected. A tare weight is placed on the compression load pan 9'. This load generates a pressure in space 80' sufficient to overcome the weight of the column and bring the transducer back to the null position, the electrical circuit between the transducer and the motor of the servo before being closed by closing switch 98'. At this point the load cell is no longer under load and the "read out" mechanism will be zeroed.

In carrying out the tension test, weights are placed on the pan 9. The load is transmitted through the piston 22 and the oil to the chamber 80 and a downward force is generated in column 83 which is resisted by the oil underneath the piston 87. This tension force will induce a stretch in the column 83 and 88.

It is noted that assuming a fixed position for the piston 88, the deflection of the test member or "read out" device 106 which is in position is proportional to the loads exerted between 88 and 85. These forces will cause the piston 71' and 71 to move downward and cause a distortion of the diaphragm. The result is a decrease in the volume of 80' and an increase in pressure in cylinder 30 of the compression regulator 28'. This will cause piston in 28' to rise, and pressure will fall until it is again equal to that imposed by the weights on the pan 9'. This pressure cannot increase to a value to uncover the port 42 for the piston 71' will bottom in 67' before this happens. In like manner, the increase in volume in 80 results in a drop in the pressure underneath the piston 22 of the regulator 28, causing the piston 22 to fall until the volume is re-established and the hydraulic pressure in the lines and chamber 80 is re-established.

The distortion of the diaphragms resulting from the downward movement of the pistons 71 and 71' is not a linear function of the pressure applied above the piston 71. The deviation from linearity becomes the greater the greater the pressure is applied through 81 and the greater are the deflections. Thus the tension load which is generated between 88 and 85, where the rod 88 is stationary, is not directly proportional to the applied load at 80. A test under varying applied loads on pan 9 will result in an applied tension load between 88 and 85, such that the ratio between the applied load on 9 and the resultant tension load becomes progressively greater as the applied load at 9 is increased.

In order to avoid this inaccuracy, I cancel out the deflection of the diaphragm 75 and the stretch of the column 83 and the motion of the piston 71 by returning the piston and diaphragm to the position which they had in the null position with no load on 9 and with the tare load on 9'. The piston 71' and the diaphragm 75' having been loaded only by the oil pressure resulting from the tare weight, have been displaced in an inconsiderable degree. Their displacement is not affected but because of load value introduces a deviation which is a second order effect and may be ignored.

As will be seen from the above the pressure in 80 generated by load on 9' is transmitted through the column 85 to the load cell and from the load cell to piston 87 (see FIG. 2).

With no net load on the cell 65 and 66 the transducer 84 undeflected, i.e., in the null position, no signal is transmitted to the torque motor of the servo-valve and no oil is admitted through either 89 or 90.

As weights are placed on pan 9, the hydrostatic pressure is transmitted through the oil to the space 80, causing a downward pressure on the piston 71 to cause a consequent deflection of the transducer 84. The signal is transmitted, amplified and impressed on the torque motor which actuates the servo-valve 98 causing oil under pressure to be introduced from $c$ and $b$ into 90 and opening the passageway from $a$ into $d$. The piston 87 is moved upward opposing the downward movement of column 83, nulling out its signal. When the position of the piston 71 is reestablished the signal from 84 going to zero, the ports $a$ and $b$ are closed and ports $c$ and $d$ are connected, the piston 71 and the diaphragm connected thereto are restored to their null undeflected position with the pressure in 80 in an amount proportional to the load on 9. This occurs at all values of the weights in force on pan 9. It is obvious of course that the magnitude of the force on 75 and thus the tension load on 83 is equal to the pan load multiplied by the ratio of the relative area of the piston 71 to the piston 22.

It will be evident to those skilled in this art that while the description of the operation of the device reported the events as discrete and sequential operations, the time interval between the steps are very small and these steps are in reality tendencies. The actual operation of the device is to balance the forces and in practical effect, the operation is to cause the piston 87 to seek a position so as to maintain the column 83 unstretched and the piston 71 and its connected diaphragm always in a substantially undeflected null position irrespective of the weights added to pan 9.

From the above description it will be seen that the device may be used to read out a compression load between 88 and 85. Thus by removing the load from the pan 9 and adding weights to the tared pan 9' the space 80 is now unloaded but the space 80' is under a proportionate pressure. The column 83 is now in neither tension nor compression. It merely moves with piston 71' to transmit the motion of 71' to the transducer. The deflection of the transducer 84 is now in an opposite direction than that when the tension test was run, sending an appropriate signal to the torque motor of the servo-valve. This causes the servo-valve to open communication between $c$ and $a$ and to connect $a$ to $d$. Oil now is introduced under pressure into 89 to oppose the motion of the column 83. The pistons 71 and 71' are thus kept in their original undeflected position with the diaphragms undeflected and with the pressure in 80' at a value proportionate to the loads on 9'.

It is of course obvious that if 106 is a load cell, pressure gage or other transducer the transducer of 106 will report the tension load or compression load imposed on 106 as the case may be.

Instead of employing a hydraulic mechanism such as 89 any equivalent motion producing means such as a rack and pinion or screw jack may be used in place thereof with suitable servo-mechanism to produce the functions of 88.

While I have described particular embodiments of my invention for the purpose of illustration, it should be understood that various modifications and adaptations thereof may be made within the spirit of the invention as set forth in the appended claims.

I claim:

1. An apparatus for applying and measuring loads comprising a load cell, said load cell including a chamber, a liquid in said chamber, a first movable member positioned in said load cell and means to displace said member responsive to hydraulic pressure generated in said chamber, means for applying a hydraulic pressure in said load cell to apply a hydraulic force against said movable member, a first motion and force transmitting connection connected to said movable member, a second movable member positioned exteriorly of said load cell, a second force and motion transmitting connection connected to said second member, means for connecting a third member to said first and second force and motion transmitting connections, means to sense the motion of said first movable member, and means responsive to said motion sensing means for applying a force to said second member and to transmit said force through said second force transmitting connection and said third member to said first member.

2. In the apparatus of claim 1, a load responsive read out mechanism connected to said first and second motion transmitting connections.

3. In the apparatus of claim 1, means to apply a static load to the liquid in said chamber to generate said pressure.

4. In the apparatus of claim 3, a load responsive read out mechanism connected to said first and second motion transmitting connections.

5. In the apparatus of claim 1, said means for applying hydraulic pressure including a pressure regulator to maintain a substantially constant pressure in said chamber.

6. In the apparatus of claim 1, a read out device connected to said first and second connections responsive to loads applied thereto, said motion sensing means including a position responsive transducer connected to said first movable member, and a servo-mechanism operatively connected to said transducer and said second member to move said second member to maintain the position of said first movable member substantially constant.

7. In the apparatus of claim 1, said means for applying a force to said second member including a hydraulic motor, a position responsive transducer connected to said first movable member, a hydraulic circuit including said hydraulic motor, a servo-valve in said hydraulic circuit, and an operative electric circuit connecting said servo-valve and said transducer for actuation of said servo-valve responsive to said signals from said transducer to move said second movable member responsive to said signals.

8. A dead weight load tester comprising a tube, a piston in said tube, means for applying a static load to said piston, liquid in said tube, said piston applying pressure to said liquid, a hydraulic load cell including a chamber containing liquid, a liquid passageway connecting said tube and said chamber, a diaphragm in said load cell subject to pressure of liquid in said chamber, a first movable member connected to said diaphragm, a first motion and force transmitting connection connected to said movable member, a second movable member positioned exteriorly of said load cell, a second force and motion transmitting connection connected to said second member, means for connecting a third member to said first and second force and motion transmitting connections, means to sense the motion of said first movable member, and means responsive to said motion sensing means for applying a force to said second member and to transmit said force through said second force transmitting connection and said third member to said first member.

9. In the tester of claim 8, a load responsive read out mechanism connected to said first and second motion transmitting connections.

10. In the tester of claim 8, a read out device connected to said first and second connections responsive to loads applied thereto, said motion sensing means including a position responsive transducer connected to said first movable member, and a servo-mechanism operatively connected to said transducer and said second member to move said second member to maintain the position of said first movable member substantially constant.

11. In the tester of claim 8, said tube being vertically positioned, said means for applying a static load to said piston comprising a column axially aligned in said tube, a second column axially aligned with said first column, said second column being loaded by said first column, said second column being axially and rotatably mounted in said tube, means to rotate said second column in said tube, and a liquid pressure regulator operatively associated with said second column and said tube.

12. A dead weight load tester comprising a pair of tubes, a piston in each tube, means for applying a static load to each piston, liquid in said tubes, said piston applying pressure to said liquid, a pair of hydraulic load cells each load cell including a chamber, liquid passageways connecting each of said tubes to the chamber of one of said load cells, a diaphragm in each load cell subject to pressure of liquid in the chamber of said load cell, a first movable member connected between said diaphragms, a first motion and force transmitting connection connected to said movable member, a second movable member positioned exteriorly of said load cells, a second force and motion transmitting connection connected to said second member, means for connecting a third member to said first and second force and motion transmitting connections, means to sense the motion of said first movable member, and means responsive to said motion sensing means for applying a force to said second member and to transmit said force through said second force transmitting connection and said third member to said first member.

13. In the tester of claim 12, a load responsive read out mechanism connected to said first and second motion transmitting connections.

14. In the tester of claim 12, a pressure regulator connected to said liquid passageways to maintain a substantially constant pressure in said chamber.

15. In the tester of claim 12, means for interconnecting said second member and said motion transmitting member, a read out device connected to said first and second connections responsive to loads applied thereto, said motion sensing means including a position responsive transducer connected to said first movable member, and a servo-mechanism operatively connected to said transducer and said second member to move said second member to maintain the position of said first movable member substantially constant.

16. In the tester of claim 12, said means for applying a force to said second member including a hydraulic motor, a position responsive transducer connected to said first movable member, a hydraulic circuit including said hydraulic motor, a servo-valve in said hydraulic circuit, and an operative electric circuit connecting said servo-valve and said transducer for actuation of said servo-valve responsive to said signals from said transducer to move said second movable member responsive to said signals.

References Cited in the file of this patent
UNITED STATES PATENTS

| | | |
|---|---|---|
| 2,090,475 | Dinzl | Aug. 17, 1937 |
| 2,766,612 | Michels | Oct. 16, 1956 |